UNITED STATES PATENT OFFICE.

PHILIPP EYER, OF FRANKFORT-ON-THE-MAIN, GERMANY.

ENAMEL COMPOSITION.

1,118,898.  Specification of Letters Patent.  Patented Nov. 24, 1914.

No Drawing.  Application filed August 25, 1914. Serial No. 858,512.

*To all whom it may concern:*

Be it known that I, PHILIPP EYER, a subject of the German Emperor, residing at Frankfort-on-the-Main, in the German Empire, have invented certain new and useful Improvements in Enamel Compositions, of which the following is a specification.

In enamel glazings, the borax is the most expensive material after the metallic oxids. In many recipes the cost of the borax far exceeds the cost of the whole of the remaining materials put together. In this position of things it would denote a considerable forward stride if a cheaper substitute were used in place of borax. Up to the present, however, borax has not been successfully replaced. It might be supposed that it would readily occur to use instead of pure borax those far cheaper natural products known under the collective name of borax lime or borate of lime, such as borocalcite, boracite, colemanite and the like, which are employed as raw materials for the manufacture of pure borax. Up to the present, however, borate of lime has not found its way into the enamel industry as a substitute for borax. This circumstance is no doubt due to the fact that up to very recently the opinion was held that it was necessary to use the purest possible borax for the manufacture of good enamel glazes. Therefore the impurities, particularly the chlorids and sulfates, contained in the borate of lime necessarily gave rise to apprehension on that score. The greatest obstacle to the use of crude borax or borate of lime was however the large percentage of lime, because experience has shown that enamel glaze becomes useless if the percentage of lime exceed a certain amount. According to the present invention, however, natural products containing or yielding boric acid or borax such as are used as the raw materials for the manufacture of borax, for instance borocalcite, colemanite, boro-sodium calcite, boracite and the like, are used in the place of pure borax after the injurious earthy alkali contained in the borate of lime has been counteracted by adding other ingredients containing lime in a proportion reduced according to the excess of lime in the borate of lime, or after the effects of an excessive content of lime have been counteracted by adding suitable auxiliary substances.

Hitherto for instance for almost all enamel recipes fluor-spar has been added as the flux. Now in accordance with the present invention in using borate of lime, the addition of fluor-spar, for instance, will be so regulated that the latter is wholly or in part replaced by sodium fluorid, according to the amount of lime contained in the borate of lime. By this simple means the injurious content of lime in the borate of lime can be counterbalanced.

The use of fluorids as a flux and clouding agent is generally known in the enamel industry. The present invention, however, consists in replacing the hitherto used fluorid compounds containing lime, by lime-free fluorid compounds in a definite proportion for the purpose of achieving a new object, namely the use of borate of lime instead of pure borax.

*Example for a priming glaze.*—Boracite 34.3, silico-fluorid of sodium 8.8, quartz 10, feldspar 33, soda 12, saltpeter 7.5, cobalt oxid 0.3.

A surprising fact in this connection is the discovery that the impurities, and even the chlorids and sulfates present in small quantities in borate of lime have no injurious effect. It is, however, preferable to use borate of lime containing only low percentages of chlorid and sulfate.

The priming glazes produced by the aid of borate of lime adhere very firmly to the article enameled. The cause of this is probably due to the fact that the salts contained in the borate of lime have a corrosive effect on the surface to be enameled.

In some cases impurities in the borate of lime may be counterbalanced similarly to the superfluous lime contained by adding suitable substances or by suitably selecting the known ingredients to be added to the enamel. In crude borax materials containing magnesia, the magnesia must be accounted equal to lime.

What is claimed is:—

1. An enamel composition comprising a natural alkali-earth borate, silico-fluorid of sodium, quartz, feldspar, soda, and saltpeter.

2. An enamel composition comprising the following ingredients in substantially the following proportions,—boracite 34.3, silicofluorid of sodium 8.8, quartz 10, feldspar 33, soda 12, saltpeter 7.5, cobalt oxid 0.3.

In testimony whereof I have signed my name to this specification in the presence of two subscribing witnesses.

PHILIPP EYER.

Witnesses:
 JEAN GRUND,
 CARL GRUND.